Sept. 28, 1937.    J. R. EATON    2,094,207
ELECTRICAL MEASURING APPARATUS
Filed Jan. 15, 1936
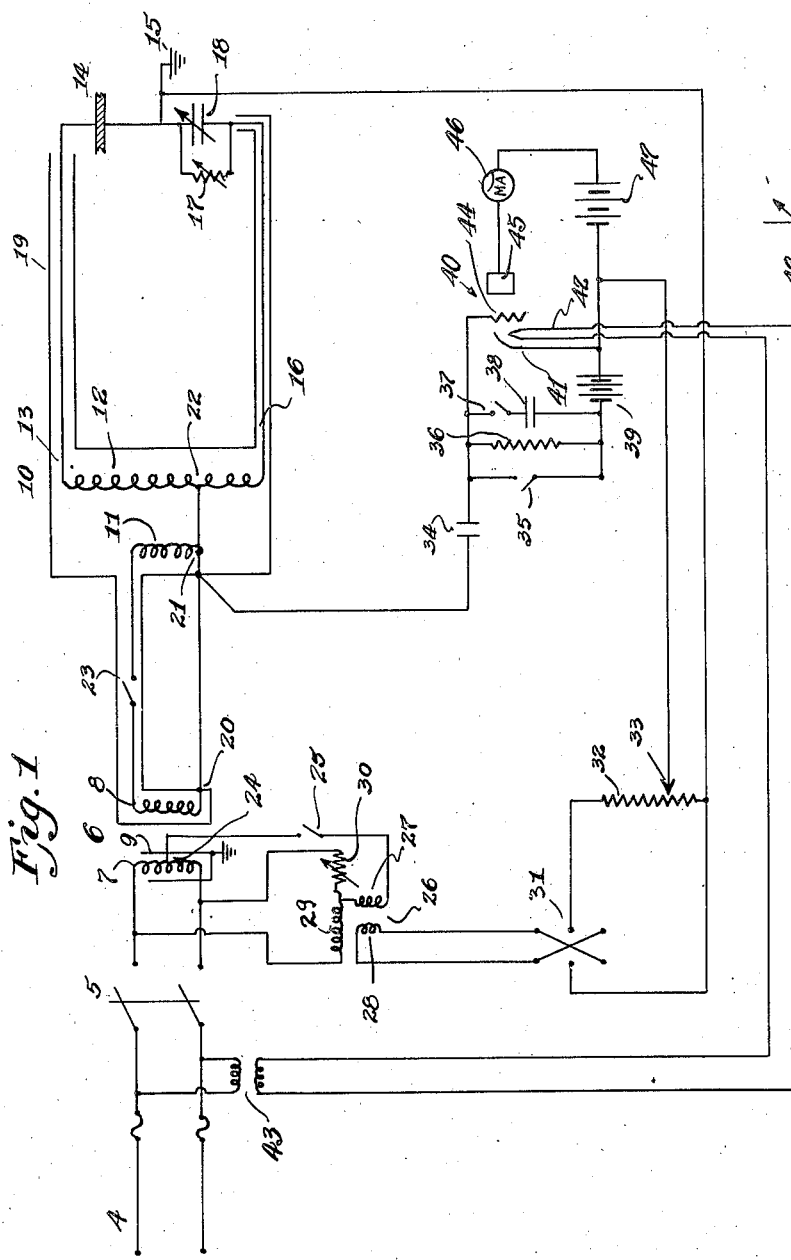
INVENTOR.
JAMES R. EATON
BY
ATTORNEY.

Patented Sept. 28, 1937

2,094,207

UNITED STATES PATENT OFFICE 2,094,207

ELECTRICAL MEASURING APPARATUS

James R. Eaton, Jackson, Mich.

Application January 15, 1936, Serial No. 59,203

18 Claims. (Cl. 175—183)

This invention relates to improvements in electrical measuring apparatus.

An important object of the invention is to provide a means for measuring the capacitance and equivalent resistance of devices, particularly electrical equipment such as capacitors, insulators, bushings, cable, etc.

A further object of the invention is to provide a means for measuring the characteristics of the devices in situ.

Other objects of the invention will be apparent during the course of the following description.

In the accompanying drawing:

Fig. 1 is a wiring diagram of the apparatus.

Fig. 2 is an alternative arrangement of the adjustable capacitance and resistance in series.

In the drawing, 4 is a connection to a suitable alternating current source which can be controlled by switch 5. An insulating transformer 6 has a primary 7 and a secondary 8. The primary 7 is surrounded by a grounded shield 9. From the secondary 8, connection is made to a step-up transformer 10 at its primary 11. The secondary 12 of this transformer is connected from its high voltage end 13 to the ungrounded terminal of the device 14 to be tested. The other terminal of the device is either permanently or temporarily connected to ground 15. The low voltage end 16 of the secondary 12 is connected to one terminal of the variable resistor 17 and one terminal of the variable condenser 18, both of which are in turn connected to ground 15. An alternate arrangement of the capacitance-resistance combination in series is shown in Fig. 2.

A shield 19 surrounds the secondary 8 of the transformer 6, connecting to one end of the secondary at 20, the entire transformer 10 connecting to its primary at 21 and its secondary at tap 22, the high voltage connection to the device to be tested 14, and the connection to the resistor 17 and condenser 18. 23 is a switch.

A voltage phase shifting and adjusting circuit consists of the midtap 24 of the transformer primary 7, a switch 25, a transformer 26 having a primary 27 and a secondary 28, an inductance 29 and a resistor 30 which is variable from zero to infinity, a reversing switch 31, and a potentiometer 32, one end of which is grounded at 15. 33 is the variable tap of the potentiometer.

A voltage detecting device consists of a condenser 34, a switch 35, a resistor 36, a switch 37, a condenser 38, a C battery 39, a thermionic tube 40 having a cathode 41, a heater 42 supplied by a transformer 43, a grid 44 and a plate 45, a milliammeter 46 and a B battery 47.

The essential part of the measuring equipment consists of the high voltage transformer 10 whose secondary voltage is divided between the test specimen 14 and the parallel combination of the resistor 17 and condenser 18. By varying 17 and 18, the division of this voltage may be adjusted at will. The transformer 6 insulates transformer 10 from any possible connection to ground through the supply lines, with the result that all current passing through specimen 14 has only one path back to the low voltage end 16 of the secondary 12, namely through the parallel combination of resistor 17 and condenser 18. The shield 19 eliminates stray capacitance to surrounding objects, and prevents the flow of current to ground through any path other than through the test specimen and the combination of 17 and 18. Therefore, it is apparent that the current through 14 is the same as flows through the combination of 17 and 18. By adjusting 17 and 18 so that no voltage exists between tap 22 and ground 15, the voltage of shield 19 will be zero and its capacitance to nearby grounded objects will be eliminated. Moreover under condition of zero voltage on 22, the voltage between 16 and 22 must be equal to and in phase with voltage between 16 and 15. As voltage between 16 and 22 must be in phase with voltage between 22 and 13, voltage between 16 and 15 must be in phase with voltage between 15 and 13. Under these conditions the capacitance and equivalent resistance of the test specimen must be proportional to the capacitance and resistance of the combination of 17 and 18. The capacitance of the specimen may be calculated by dividing the capacitance of 18 by the ratio of the voltage between 22 and 13 and the voltage between 16 and 22. The equivalent resistance of the specimen may be calculated by multiplying the resistance of 17 by this same ratio.

The presence of voltage between 22 and ground is detected by the voltage indicating device of the vacuum tube voltmeter type. Closing switch 35 removes all alternating voltage from the grid 44 and hence operation of this switch will result in a change in deflection of the milliammeter 46 in case an alternating voltage is being impressed on the grid of the vacuum tube voltmeter. Closing switch 37 reduces the sensitivity of the device, thereby facilitating rough adjustment of 17 and 18.

When the test set is operated near energized conductors, an alternating voltage may appear between the grid 44 and the cathode 41 of the voltage detecting device, as indicated by a change in deflection of milliammeter 46 when switch 35 is opened and closed, even before transformer 10 is energized. The presence of such an alternating voltage indicates that the neighboring energized equipment is influencing the test set, and that incorrect test results will be obtained unless this influence is neutralized before the measurement is made. To neutralize this interference, switch 23 is opened and switches 5 and 25 are closed, thereby leaving transformer 10 de-energized while the voltage phase shifting and adjusting device is energized. Condenser 18 is set at a value estimated to be approximately its setting if used to balance the capacitance of the test specimen.

By varying the resistance 30 between zero and infinity ohms, the voltage applied to potentiometer 32 may be varied through 180 electrical degrees. By use of the reversing switch 31 also, the voltage applied to the potentiometer 32 may be of any desired phase position. Adjustment of tap 33 of the potentiometer 32 makes possible a selection of voltage of any value within the limits of the equipment. This voltage phase shifting and adjusting device, therefore, is able to apply to the cathode 41 an alternating voltage of such phase position and magnitude that no alternating potential exists between 44 and 41, as indicated by zero change of deflection of the milliammeter when switch 35 is opened or closed. Under such conditions, when transformer 10 is energized by closing switch 23, the alternating voltage between 44 and 41 will be due entirely to the effects of voltage supplied by 10. The set may then be used in the usual manner with accurate results.

Operation of the equipment in the field is usually conducted as follows: With switch 5 open, switch 35 is opened and closed. If a change in the deflection of the milliammeter is noted, stray voltage is present on the set and must be balanced out by means of the phase shifting and adjusting device. If no change in deflection is noted, this operation may be omitted. To balance out stray voltage on the set, switch 23 is opened and switches 5 and 25 are closed. Resistance 30, reversing switch 31 and potentiometer 32 are adjusted until no change in deflection is noted when switch 35 is closed and opened. Next, switch 23 is closed applying test voltage to the specimen. If necessary, switch 37 is closed to make the voltage indicating device less sensitive during preliminary adjustment, and then resistor 17 and condenser 18 are adjusted until no alternating voltage is indicated between 21 and 41. Switch 23 is then opened and a check made to ascertain that the stray voltage remains balanced out with the changes necessary in 17 and 18. With the set finally adjusted, no alternating voltage should be indicated between 21 and 41 with switch 23 either open or closed.

What I claim is:

1. An instrument for measuring the capacitance and equivalent resistance of electrical equipment under alternating voltage stress comprising a source of alternating voltage having an intermediate tap, means for insulating this source from unwanted connections to ground, a combination of variable resistance and variable capacitance connected between one end of the voltage source and ground, a connection from the other end of the voltage source to the ungrounded terminal of the test specimen, the other terminal of which is grounded, a shield which surrounds the voltage source, the connections thereto, the connection to the test specimen, and the connection to the resistance-capacitance combination, a connection between the intermediate tap in the voltage source and the shield, a potential detecting device, and a device capable of producing a voltage of any phase position and of adjustable magnitude connected in series with the potential detecting device between the intermediate tap of the voltage source and ground.

2. An instrument for measuring the capacitance and equivalent resistance of electrical equipment under alternating voltage stress comprising a source of alternating voltage having an intermediate tap, means for insulating this source from unwanted connections to ground, a combination of variable resistance and variable capacitance connected between one end of the voltage source and ground, a connection from the other end of the voltage source to the ungrounded terminal of the test specimen, the other terminal of which is grounded, a potential detecting device, and a device capable of producing a voltage of any phase position and of adjustable magnitude connected in series with the potential detecting device between the intermediate tap of the voltage source and ground.

3. An instrument for measuring the capacitance and equivalent resistance of electrical equipment under alternating voltage stress comprising a source of alternating voltage having an intermediate tap, means for insulating this source from unwanted connections to ground, a combination of variable resistance and variable capacitance connected between one end of the voltage source and ground, a connection from the other end of the voltage source to the ungrounded terminal of the test specimen, the other terminal of which is grounded, a shield which surrounds the voltage source, the connections thereto, the connection to the test specimen, and the connection to the resistance-capacitance combination, a connection between the intermediate tap in the voltage source and the shield, a potential detecting device connected between the intermediate tap of the voltage source and ground.

4. An instrument for measuring the capacitance and equivalent resistance of electrical equipment under alternating voltage stress comprising a source of alternating voltage having an intermediate tap, means for insulating this source from unwanted connections to ground, a combination of variable resistance and variable capacitance connected between one end of the voltage source and ground, a connection from the other end of the voltage source to the ungrounded terminal of the test specimen, the other terminal of which is grounded, a potential detecting device connected between the intermediate tap of the voltage source and ground.

5. An instrument for measuring the capacitive reactance and equivalent resistance of any device under alternating voltage stress comprising, a source of alternating voltage, a combination of variable resistance and variable capacitance connected in circuit with the voltage source and the test specimen, means of comparing the magnitudes and phase relation of the voltage source and the voltage appearing across the resistance-capacitance combination.

6. An instrument for measuring the capacitive reactance and equivalent resistance of any device under alternating voltage stress comprising, a source of alternating voltage, a combination of resistance and capacitance connected in circuit with the voltage source and the test specimen, means of comparing the magnitudes and phase relation of the voltage source and the voltage appearing across the resistance-capacitance combination.

7. An instrument for testing electrical insulation under alternating voltage stress comprising the combination of circuits including a high alternating voltage circuit in which the specimen is arranged to be included and means by which determinations may be made of the capacitance and equivalent resistance of the specimen, and an interference balancing means in operative relation with said circuits and provided with devices by which the effects of stray currents due to the presence of nearby electrical conductors can be balanced out.

8. An instrument for testing electrical insulation under alternating voltage stress comprising the combination of circuits including a high voltage circuit in which the specimen is arranged to be included and means by which determinations may be made of the capacitance and equivalent resistance of the specimen, interference balancing means in operative relation with said circuits and provided with devices by which the effects of stray currents due to the presence of nearby electrical conductors can be balanced out, and a shield for confining the effects of the test voltage to the test specimen.

9. An instrument for testing electrical insulation under alternating voltage stress comprising the combination of circuits including a high voltage circuit in which the specimen is arranged to be included and an adjustable resistance and an adjustable capacitance by which determinations may be made of the capacitance and equivalent resistance of the specimen, and interference balancing means in operative relation with said circuits and provided with devices by which the effects of stray currents due to the presence of nearby electrical conductors can be balanced out.

10. An instrument for testing electrical insulation under alternating voltage stress comprising the combination of circuits including a high voltage circuit in which the specimen is arranged to be included and an adjustable resistance and an adjustable capacitance by which determinations may be made of the capacitance and equivalent resistance of the specimen, interference balancing means in operative relation with said circuits and provided with devices by which the effects of stray currents due to the presence of nearby electrical conductors can be balanced out and a shield for confining the effects of the test voltage to the test specimen.

11. An instrument for testing electrical insulation under alternating voltage stress comprising the combination of circuits including a high voltage circuit in which the specimen is arranged to be included and means by which determinations may be made of the capacitance and equivalent resistance of the specimen, and interference balancing means in operative relation with said circuits and provided with devices by which the effects of stray currents due to the presence of nearby electrical conductors can be balanced out including a phase adjuster, a potentiometer and a voltmeter.

12. An instrument for testing electrical insulation under alternating voltage stress comprising the combination of circuits including a high voltage circuit in which the specimen is arranged to be included and an adjustable resistance and an adjustable capacitance by which determinations may be made of the capacitance and equivalent resistance of the specimen, and interference balancing means in operative relation with said circuits and provided with devices by which the effects of stray currents due to the presence of nearby electrical conductors can be balanced out including a phase adjuster, a potentiometer and a voltmeter, the said adjustable resistance and the said adjustable capacitance being adjustable to indicate zero potential on the voltmeter and from which adjustments the calculation of the energy loss may be determined.

13. An instrument for testing electrical insulation under alternating voltage stress comprising the combination of circuits including a high voltage circuit in which the specimen is arranged to be included and means by which determinations may be made of the capacitance and equivalent resistance of the specimen, interference balancing means in operative relation with said circuits and provided with devices by which the effects of stray currents due to the presence of nearby electrical conductors can be balanced out including a phase adjuster, a potentiometer, a voltmeter and a current reversing switch.

14. An instrument for testing electrical insulation under alternating voltage stress comprising the combination of circuits including a high voltage circuit in which the specimen is arranged to be included and an adjustable resistance and an adjustable capacitance by which determinations may be made of the capacitance and equivalent resistance of the specimen, interference balancing means in operative relation with said circuits and provided with devices by which the effects of stray currents due to the presence of nearby electrical conductors can be balanced out including a phase adjuster, a potentiometer and a voltmeter and by which voltmeter the adjustable resistance and the adjustable capacitance may be adjusted to indicate zero potential on the voltmeter and from which adjustments the calculation of the energy loss may be determined, and shielding means for confining the effects of the test voltage to the test specimen.

15. An instrument for testing electrical insulation under alternating voltage stress comprising the combination of circuits including a high voltage circuit in which the specimen is arranged to be included, means by which determinations may be made of the capacitance and equivalent resistance of the specimen, interference balancing means in operative relation with said circuits and provided with devices by which the effects of stray currents due to the presence of nearby electrical conductors can be balanced out including a phase adjuster, a potentiometer and a voltmeter, said voltmeter being also used in connection with the first mentioned means for securing said determinations.

16. An instrument for measuring the capacitance and equivalent resistance of electrical equipment under alternating voltage stress comprising a test transformer, the high voltage end of which is arranged to be connected to one side of a grounded specimen to be tested, means for completing the circuit through the specimen and the ground to the low voltage end of the secondary of the transformer, an adjustable resistance and capacitance in said last circuit between the ground and the secondary of the test transformer, a voltmeter connected into the primary circuit of the transformer for indicating when the voltage across the capacitance and resistance is in phase with the test voltage applied to the specimen, whereby the capacitance and equivalent resistance of the specimen can be determined directly from the adjusted indicated values of the resistance and capacitance required for balancing the circuit.

17. An instrument for measuring the capacitance and equivalent resistance of electrical equipment under alternating voltage stress comprising a test transformer, the high voltage end of which is arranged to be connected to one side of a grounded specimen to be tested, means for completing the circuit through the specimen and the ground to the low voltage end of the secondary of the transformer, an adjustable resistance and capacitance in said last circuit between the ground and the secondary of the test transformer, a voltmeter connected into the primary circuit of the transformer for indicating when the voltage across the capacitance and resistance is in phase with the test voltage applied to the specimen, whereby the capacitance and equivalent resistance of the specimen can be determined directly from the adjusted indicated values of the resistance and capacitance required for balancing the circuit, the adjustment of said resistance and capacitance to balance the circuit to the point at which no voltage is indicated on the voltmeter being effective to reduce the transformer and all other connections except the circuit leading to the resistance and capacitance and the connection to the specimen to substantially a ground potential to negative the effect of stray capacitance.

18. The method of measuring the dielectric loss in insulating units adapted for high voltage alternating currents, which comprises applying a test voltage to a grounded insulated specimen, causing the current flowing through the specimen to flow from the ground terminal through an adjustable capacitance and adjustable resistance, adjusting such capacitance and resistance whereby the voltage across the same will be in phase with the test voltage applied to the specimen and then taking a reading of said adjusted capacitance and resistance to determine the capacitance and equivalent resistance of the specimen.

JAMES R. EATON.